UNITED STATES PATENT OFFICE.

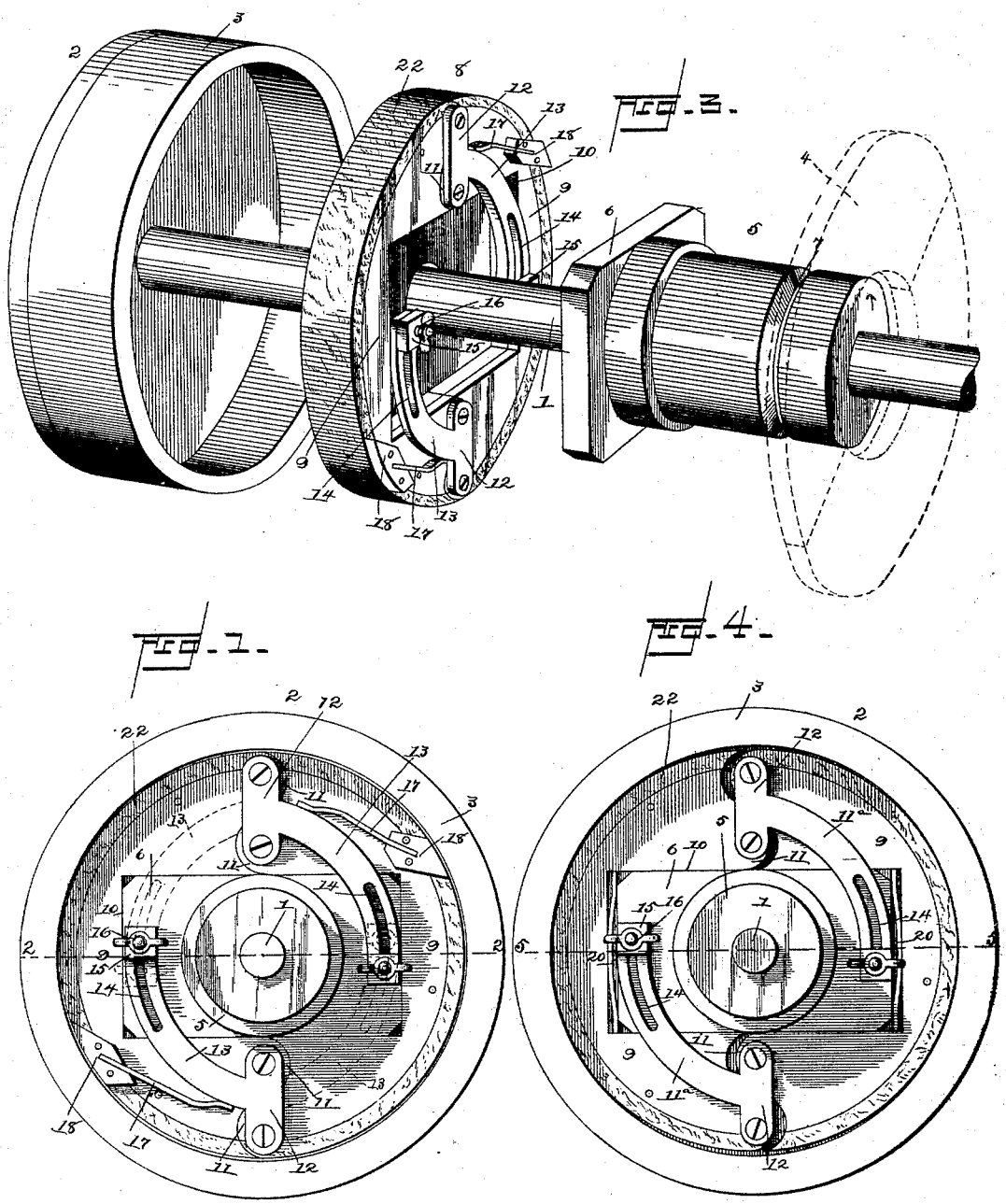

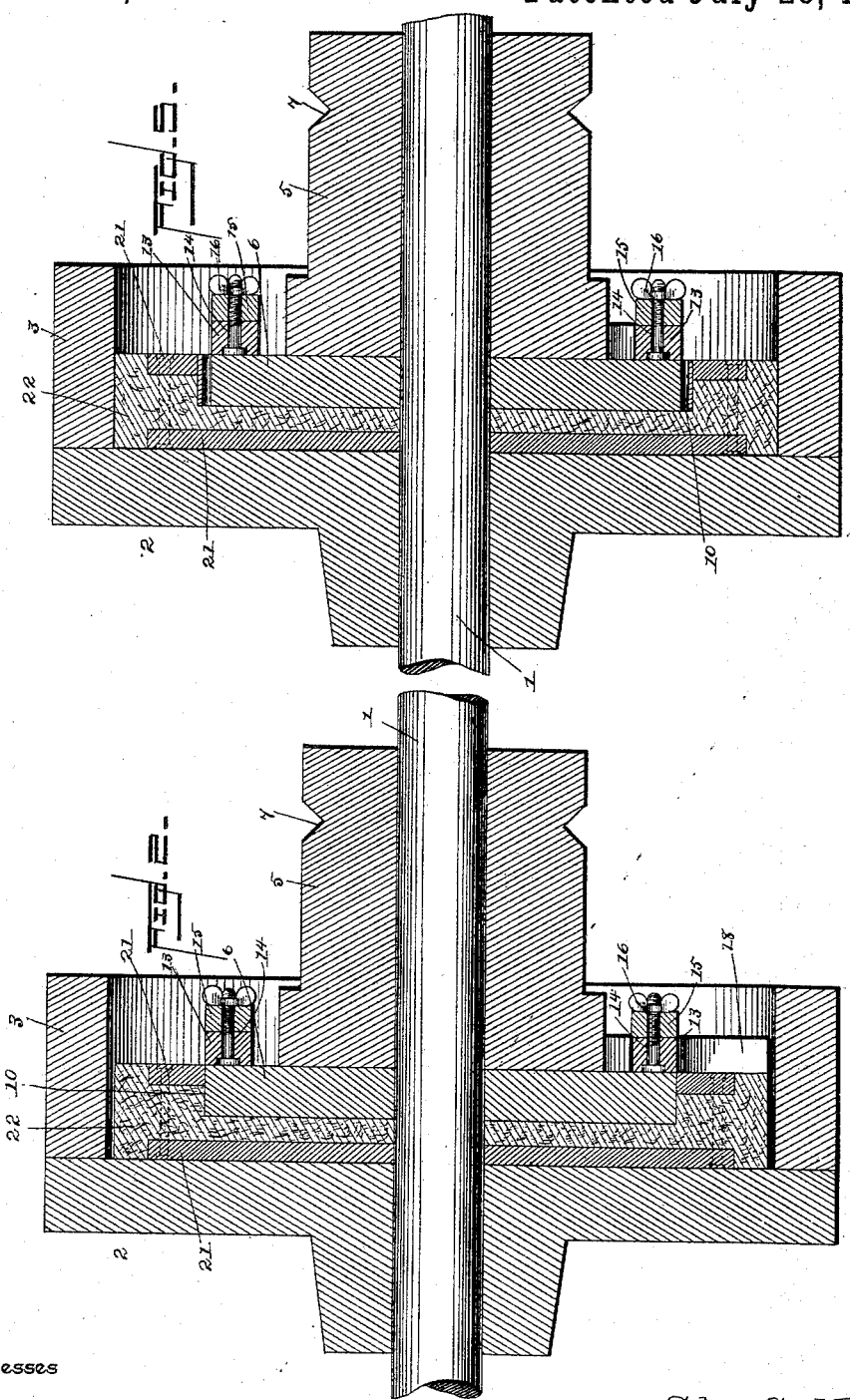

SOLON G. HENKEL, OF NEW MARKET, VIRGINIA.

FRICTION-CLUTCH AND SPEED-GOVERNOR.

SPECIFICATION forming part of Letters Patent No. 456,652, dated July 28, 1891.

Application filed February 4, 1891. Serial No. 380,118. (No model.)

*To all whom it may concern:*

Be it known that I, SOLON G. HENKEL, a citizen of the United States, residing at New Market, in the county of Shenandoah and State of Virginia, have invented a new and useful Friction-Clutch and Speed-Governor, of which the following is a specification.

This invention relates to devices for transmitting rotary motion in various kinds of machinery; and it has for its object to provide a device of this class in which the speed shall be automatically regulated, and which shall be simple in construction, durable, and efficient in operation.

The invention consists in the improved construction, arrangement, and combination of parts, which will be hereinafter fully described, and particularly pointed out in the claims.

In the drawings hereto annexed, Figure 1 is a side elevation showing one form of my improved friction-clutch and speed-governor, the covering-plate having been removed from the same. Fig. 2 is a sectional view taken on the line 2 2 in Fig. 1. Fig. 3 is a perspective view showing the parts constituting my invention separated and detached from each other. Fig. 4 is a side elevation showing a modification. Fig. 5 is a sectional view taken on the line 5 5 in Fig. 4.

Like numerals of reference indicate like parts in all the figures of the drawings.

1 designates the shaft, upon which is mounted a disk 2, having an annular flange 3, forming a cylindrical casing, which may be provided with a cover 4. The latter is preferably made in two parts or sections, so as to be conveniently mounted upon a shaft when the construction and arrangement of parts are such as to prevent the said cover from being slid into position endwise upon the shaft. The cylindrical casing composed of the annularly-flanged disk may be mounted loosely or rigidly upon the shaft, as may be desired, according to the circumstances under which the device is to be used.

5 designates a hub or collar, which is provided at one end with a rectangular plate 6. Said hub or collar, which may be mounted loosely or rigidly upon the shaft, as desired, may be provided with an annular groove 7, whereby it is adapted to be connected by means of a belt or band with machinery, to or from which power is to be transmitted.

The friction-disk, which is designated by 8, is circular in shape, and is of a diameter slightly less than the interior diameter of the flange 3, forming part of the casing or clutch. Said friction-disk is composed of the leaves 9 9, which are provided with recesses, as 10, to accommodate the rectangular plate 6. The leaves 9 9 are provided at their meeting edges, adjacent to the recesses 10, with tongues 11, extending beyond each other and past the diameter of the disk, and they are connected at the sides of said recesses by means of the pivoted links 12, having curved arms or levers 13, provided with slots 14, in which weights 15 are adjustably mounted by means of set-screws 16, or in any other suitable manner. It will be seen that by the construction shown in Fig. 1 of the drawings, when the levers 13 are thrown in an outward direction, the links 12 will be actuated to spread the leaves or sections 9 apart or to force them in an outward direction. Normally, however, the said levers are moved in an inward direction by means of springs 17, mounted in suitable lugs 18, upon the leaves 9, adjacent to the levers 13.

The operation of the device shown in Fig. 1 of the drawings is as follows: The hub carrying the rectangular plate 6 is mounted loosely upon the shaft, and is adapted to receive motion in any suitable manner from driving mechanism of any desired construction—as, for instance, the saw-arbor in a circular-saw mill. When the hub attains a certain rate of speed, the friction-disk receiving motion from the rectangular plate 6, seated in the recesses 10, is rotated, and the levers 13 are thrown by centrifugal force in an outward direction, thus forcing the leaves 9 apart from each other and into contact with the flange 3 of the disk 2, forming the casing of the clutch. The said flange or casing may be utilized as a band wheel or pulley, from which motion will be transmitted to the machinery which is to be driven—such as, for example, the feed mechanism of a saw-mill. It is obvious that whenever excessive or unusual resistance is encountered the speed is instantly slackened and the action of the spring 17, overcoming the centrifugal action, will move the lever 13 in an inward direction, thus bringing the leaves 9 together and accordingly reducing the friction and the speed of the driven mechanism.

By the modification of my invention shown in Fig. 4 of the drawings the levers 13 and links 12 are arranged, when the levers are moved in an outward direction to force the leaves 9 together or in the direction of each other. This result is in Fig. 4 attained by reversing the relative positions of the tongues 11 at the meeting edges of the levers 9. It may, however, be equally well attained by simply reversing the levers 13 and links 12, as will be seen in dotted lines in Fig. 1 of the drawings. In the example of my invention illustrated in Fig. 4 the springs 17, pressing against the outer sides of the levers 13, are dispensed with, and instead thereof springs, as 20, are interposed between the ends of the rectangular plate 6 and the adjacent walls of the recesses 10 in the friction-disk. The leaves of the latter are thus normally held apart from each other and in contact with the inner side of the flange 3 of the casing. When the device is rotated, however, the weighted arms or levers 13, being thrown in an outward direction by the centrifugal action, will force the friction-leaves in the direction of each other against the tension of the springs, thus reducing the frictional contact between the leaves 9 and the flange 3 of the casing.

The operation of the modification will be readily understood. When the speed of the driven machinery becomes too great, the centrifugal action will force the levers or arms 13 in an outward direction, thus bringing the leaves 9 together and reducing the frictional contact between said leaves and the annular flange 3 of the casing, and consequently reducing the speed.

While the friction-disk 8 or the leaves composing the same may be made of wood, cast-iron, or any other material, it is preferred to construct the said leaves of shells 21 of metal or other suitable material, connected by means of bolts, rivets, or in any other suitable manner, and inclosing between them the disks 22, of vulcanized fiber, which possesses the requisite qualities of durability, strength, lightness, and tenacity, which will cause it to engage the adjacent wall of the flange 3 with the necessary degree of friction.

It will be obvious from the foregoing description that the detailed construction of my improved friction-clutch and speed-governor may be modified in other particulars than those herein specified without departing from the spirit of my invention. Thus, for instance, might the construction and arrangement of the springs be modified, provided that they are so arranged as to force the friction-leaves 9 together or apart from each other, according to the proposed construction of the clutch. I reserve the right to this and to any other modifications to which recourse may be had and which are within the scope of the invention.

Having thus described my invention, what I claim is—

1. In a device of the class described, the combination, with a suitable casing, of a friction-disk inclosed within said casing and composed of leaves having tongues at their meeting edges, projecting past each other and beyond the diameter of the disk, and connecting-links, the ends of which are connected pivotally with said tongues, substantially as and for the purpose set forth.

2. The combination, with a cylindrical casing, of a friction-disk inclosed within said casing and composed of leaves or halves having tongues at their meeting edges, the connecting-links having their ends connected pivotally with said tongues, and the levers extending from said links and adapted to be operated by centrifugal action to adjust the leaves of the friction-disk, substantially as set forth.

3. The combination of the cylindrical casing, a shaft, a hub or collar provided with a rectangular plate, and a friction-disk composed of leaves suitably connected and having recesses to receive the said plate, a lever or levers adapted to be operated by centrifugal action to adjust said leaves, and springs for forcing the friction-leaves against the centrifugal action, substantially as set forth.

4. The combination of the cylindrical casing, a hub having a rectangular plate, and a friction-disk composed of leaves connected by pivoted links having outwardly-extending arms provided with adjustable weights, and springs arranged to force the friction-leaves together or apart from each other, substantially as set forth.

5. The combination of the cylindrical casing, a hub having a rectangular plate, a friction-disk composed of leaves having recesses to accommodate the said plate, the pivoted links connecting said leaves and having outwardly-extending slotted arms, the weights mounted adjustably in said slots, and springs arranged to force the friction-leaves together or apart from each other, substantially as and for the purpose herein set forth.

In testimony that I claim the foregoing as my own I have hereto affixed my signature in presence of two witnesses.

S. G. HENKEL.

Witnesses:
J. H. SIGGERS,
OTTO H. HENKEL.